United States Patent
Hollander et al.

(10) Patent No.: US 12,372,473 B2
(45) Date of Patent: *Jul. 29, 2025

(54) ACCURATE RAMAN SPECTROSCOPY

(71) Applicant: NOVA LTD., Rehovot (IL)

(72) Inventors: Eyal Hollander, Ramat Hasharon (IL); Gilad Barak, Rehovot (IL); Elad Schleifer, Rehovot (IL); Yonatan Oren, Kiryat Ono (IL); Amir Shayari, Rehovot (IL)

(73) Assignee: NOVA LTD., Rehovot (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,708

(22) Filed: Jan. 2, 2024

(65) Prior Publication Data
US 2024/0210322 A1    Jun. 27, 2024

Related U.S. Application Data

(63) Continuation of application No. 17/816,713, filed on Aug. 1, 2022, now Pat. No. 11,860,104, which is a
(Continued)

(51) Int. Cl.
*G01J 3/44* (2006.01)
*G01J 3/02* (2006.01)
*G01N 21/65* (2006.01)

(52) U.S. Cl.
CPC ............ *G01N 21/65* (2013.01); *G01J 3/0205* (2013.01); *G01J 3/027* (2013.01); *G01J 3/4412* (2013.01);
(Continued)

(58) Field of Classification Search
CPC ........ G01N 21/65; G01J 3/0205; G01J 3/027; G01J 3/4412; G01J 3/44; G01J 3/28; G01J 3/02; G01J 3/0286; A61B 5/0075
See application file for complete search history.

(56) References Cited

U.S. PATENT DOCUMENTS

| | | | |
|---|---|---|---|
| 4,957,367 A | 9/1990 | Dulman | |
| 5,713,364 A | 2/1998 | Debaryshe et al. | |

(Continued)

FOREIGN PATENT DOCUMENTS

| | | | |
|---|---|---|---|
| JP | H07333508 A | 12/1995 | |
| JP | 2008116432 A | 5/2008 | |

(Continued)

*Primary Examiner* — Abdullahi Nur
(74) *Attorney, Agent, or Firm* — Reches Patents

(57) ABSTRACT

A method, a system, and a non-transitory computer readable medium for Raman spectroscopy. The method may include determining first acquisition parameters of a Raman spectroscope to provide a first acquisition set-up, the determining is based on at least one expected radiation pattern to be detected by a sensor of the Raman spectroscope as a result of an illumination of a first area of a sample, the first area comprises a first nano-scale structure, wherein at least a part of the at least one expected radiation pattern is indicative of at least one property of interest of the first nano-scale structure of the sample; wherein the first acquisition parameters belong to a group of acquisition parameters; setting the Raman spectroscope according to the first acquisition set-up; and acquiring at least one first Raman spectrum of the first nano-scale structure of the sample, while being set according to the first acquisition set-up

18 Claims, 13 Drawing Sheets

Related U.S. Application Data continuation of application No. 17/020,587, filed on Sep. 14, 2020, now Pat. No. 11,415,519.

(52) U.S. Cl.
CPC ............ *G01N 2201/06113* (2013.01); *G01N 2201/0636* (2013.01)

(56) References Cited

U.S. PATENT DOCUMENTS

| | | |
|---|---|---|
| 6,151,522 A * | 11/2000 | Alfano ................ A61B 5/0084 |
| | | 600/475 |
| 11,092,494 B1 | 8/2021 | Carron et al. |
| 2002/0105640 A1 | 8/2002 | Deck et al. |
| 2003/0155537 A1 | 8/2003 | Machavariani et al. |
| 2004/0090621 A1 | 5/2004 | Bennett et al. |
| 2009/0021724 A1 | 1/2009 | Mahadevan-Jansen et al. |
| 2009/0066934 A1 * | 3/2009 | Gao ..................... G01N 1/2273 |
| | | 356/417 |
| 2011/0147613 A1 | 6/2011 | Rigneault et al. |
| 2015/0054941 A1 | 2/2015 | Ogawa et al. |
| 2015/0185076 A1 | 7/2015 | Zhao et al. |
| 2016/0178439 A1 * | 6/2016 | Freudiger ................ G01J 3/44 |
| | | 356/301 |
| 2017/0122948 A1 | 5/2017 | Schuetze et al. |
| 2017/0276610 A1 | 9/2017 | Fujita et al. |
| 2018/0372644 A1 | 12/2018 | Barak et al. |

FOREIGN PATENT DOCUMENTS

| | | |
|---|---|---|
| JP | 5519506 | 6/2014 |
| WO | 2010016267 A1 | 2/2010 |
| WO | 2016059703 A1 | 4/2016 |
| WO | 2018140602 A1 | 8/2018 |
| WO | 2021144634 A1 | 7/2021 |

* cited by examiner

ACCURATE RAMAN SPECTROSCOPY

BACKGROUND

Raman Spectroscopy is an established technology, with extensive literature describing its usage for the characterization of various material properties.

The Raman spectrum carries information on various properties of a sample. Most notably, different peaks in the spectrum correspond to different materials. When the measured target is comprised of material compounds (e.g. SiGe), specific peaks in the Raman spectrum would correspond to different atom pairs (e.g. Si—Si, Si—Ge and Ge—Ge).

Methods for extracting information on concentration and stress from the positions of these peaks are well known in the literature. For example, a set of equations relating the positions of the three SiGe peaks with the Germanium composition and the layer stress, is presented in the following publication: T. S. Perov et al., Composition and strain in thin Sii-xGex virtual substrates measured by micro-Raman spectroscopy and x-ray diffraction, J. App. Phys. 109, 033502 (2011).

Doping is another characteristic which affects the Raman spectrum. Carrier concentration, arising from the dopant distribution, affects the Raman signal and causes an additional shift in the Raman peaks. The level of doping can hence be incorporated into the fitting procedure, and concurrent assessment of doping level along with stress and composition is possible through monitoring peak locations (see for example—A. Perez-Rodriguez et al., Effect of stress and composition on the Raman spectra of etch-stop SiGeB layers, J. Appl. Phys. 80, 15 (1996).

Examples of state of the art systems that generate Raman spectrums are provided in PCT patent applications publication serial numbers WO2017/103934 of Barak et el. and WO2017/103935 of Barak et al., both applications are incorporated herein by reference.

In common Raman spectroscopy the image on the spectrometer is of the Raman spectrum at various wavelengths only and at a single illumination direction—which reduces the information that can be obtained during Raman spectroscopy.

SUMMARY

There may be provided a system, a method and a non-transitory computer readable medium that stores instructions for accurate Raman spectroscopy.

BRIEF DESCRIPTION OF THE DRAWINGS

In order to understand the invention and to see how it may be carried out in practice, a preferred embodiment will now be described, by way of non-limiting example only, with reference to the accompanying drawings.

DETAILED DESCRIPTION OF THE DRAWINGS

Figure 1:
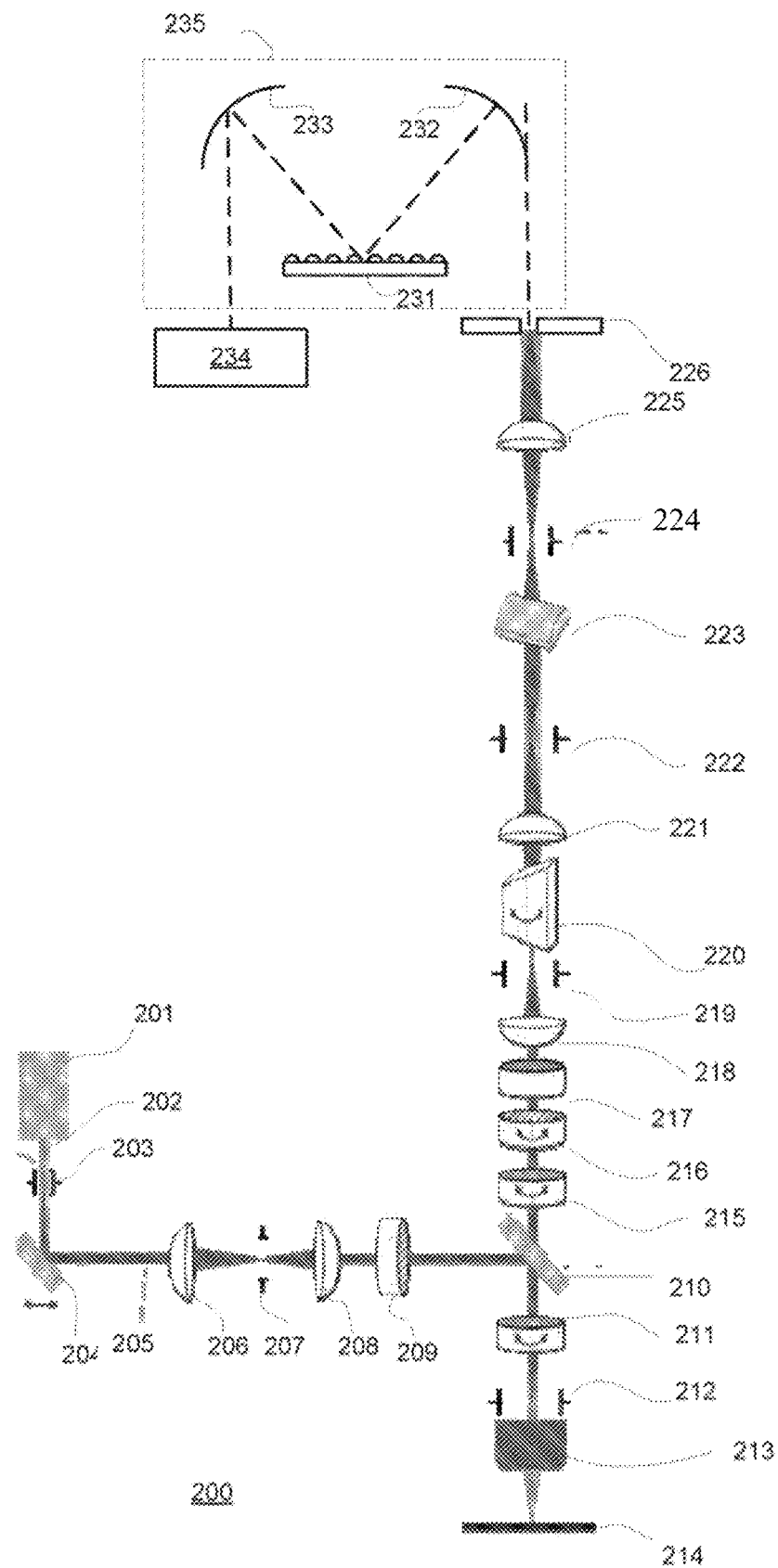
FIG. 1 illustrates an example of some elements of the optical measurement system.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to either one of a system, a method and a non-transitory computer readable medium should be applied mutatis mutandis to any other of the system, a method and a non-transitory computer readable medium. For example—any reference to a system should be applied mutatis mutandis to a method that can be executed by the system and to a non-transitory computer readable medium that may stores instructions executable by the system.

Because the illustrated at least one embodiment of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any number, or value illustrated below should be regarded as a non-limiting example.

There may be provided a system, a method, and a non-transitory computer readable medium that stores instructions for accurate Raman spectroscopy.

There may be provided a system, a method, and a non-transitory computer readable medium that stores instructions for collection and interpretation of angle resolved Raman scattered light from Raman-active materials, micro-structures and nano-structures.

There may be provided a system, a method, and a non-transitory computer readable medium that stores instructions that may obtain Raman spectra at different scattering angles.

There may be provided a system, a method, and a non-transitory computer readable medium that stores instructions for illuminating the sample from different illumination angles, creating additional independent spectra.

There may be provided a system, a method, and a non-transitory computer readable medium that stores instructions for using polarization optics, enabling control of illumination polarization continuously and extraction of specific Raman spectra at different polarizations.

There may be provided a system, a method, and a non-transitory computer readable medium that stores instructions for performing further analysis of information retrieved from the illumination of the sample for unraveling critical quantities about the nano-structure materials and dimensions.

The terms "micro-scale" and "nano-scale" are used in an interchangeable manner. Any reference to a nano-scale may be applied mutatis mutandis to a micro-scale. Nano-scale means having at least one dimension that may range between one tenth of a nanometer till one hundred nanometers. Micro-scale means having at least one dimension that may range between one tenth of a micron till one hundred microns.

FIG. 1 illustrates an example of some elements of the optical measurement system.

FIG. 1 illustrates an example of a part 200 of an optical measurement system.

Part 200 allows to illumination sample 300 by a laser or other light source (or several light sources) from various angles and polarizations and the collection of Raman scattered light from the sample from various angles and polarizations.

Part 200 includes an illumination path that includes laser 201, field imaging path 202, entrance aperture stop 203, mirror 204, aperture imaging path 205, first illumination lens 206, illumination field stop 207, second illumination lens 208, illumination polarizer 209, beam splitter 210, illumination half wavelength plate (HWP) such as a illumination rotating HWP 211, objective aperture stop/back focal plane 212, and objective lens 213.

The collection path (for collecting radiation from sample 214) includes objective lens 213, objective aperture stop/back focal plane 212, beam splitter 210, collection quarter wavelength plate (QWP) such as collection rotating QWP 215, collection rotating polarizer 216, collection filter 217, first collection lens 218, first collection field stop 219, rotating dove prism 220, second collection lens 221, collection aperture stop 222, cylindrical lens 223, second field stop 224, slit lens 225, slit 226 and optical unit 235.

The optical unit 235 may be an optical spectrometer.

In FIG. 1 the optical unit 235 is illustrated as including a grid (grating) 231, first mirror/lens 232 for directing radiation that passed through the region of interest onto the grid 231, second lens/mirror 233 for directing light from grid 231 towards a detector 234.

The Illumination Path

The optical scheme in FIG. 1 describes two main imaging paths. First, the central imaging path follows a path of a collimated light beam exiting from a laser 201. The beam goes through entrance aperture stop 203, and is reflected by mirror 204. The mirror 204 position may be controlled by a linear motor or any other mechanical manipulator, causing a lateral shift in the reflected laser beam. The laser beam is then focused by first illumination lens 206 onto illumination field stop 207 and recollimated again by second illumination lens 208. It than passes through illumination polarizer 209 and is partially reflected by beam splitter 210. The reflected light then goes through illumination rotating HWP 211 which rotates the polarization. After passing the waveplate, the light goes through a high NA (numerical aperture) objective lens 213 and is imaged on the plane of sample 214.

The second imaging path is wider that the first and illustrates the imaging of the entrance aperture stop 203 onto the objective aperture stop/back focal plane 212. This is done using the relay lenses (first illumination lens 206 and second illumination lens 208). The magnification between entrance aperture stop 203 and objective aperture stop/back focal plane 212 is a function of the focal lengths of first illumination lens 206 and second illumination lens 208: $M=f_2/f_1$.

The Collection Path

After reaching the sample, light is scattered from it and goes through the objective and waveplate (thus, the polarization of Reighley scattered light is rotated back to its original state). From there, it reaches the beam splitter 210, where part of the scattered light is transmitted and reaches collection rotating QWP 215, collection rotating polarizer 216 collection filter 217 that may be a long-pass filter which filters the Reighley scattered light and transmits only the Raman scattered light. Then, using first collection lens 218, the light is focused onto a conjugate plane where first collection field stop 219 is located.

Close to the field stop there is a rotating dove prism 220, responsible for rotating the image of the aperture stop. After that, second collection lens 221 collimates the light again. The image of the objective aperture stop/back focal plane 212 (rotated by the dove prism) is formed at the focal plane of second collection lens 221 on the collection aperture stop 222. Following that, cylindrical lens 223 focuses the light in one direction onto second field stop 224. At this surface, the rays originating from the aperture stop are collimated in one direction. A slit lens 225 creates an image of the Raman scattered light on a slit 226, where one direction (x) holds information on different field points and the other direction (y) holds information on different angular (NA) points.

Angle of Illumination (AOI) Control.

Figure 2:
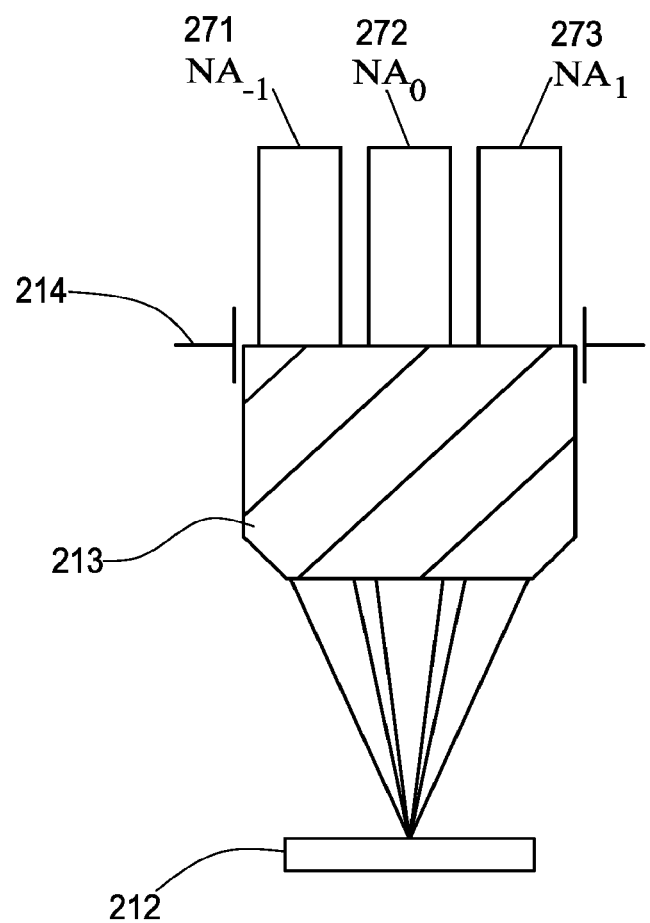
FIG. 2 illustrates examples of illuminating a sample from different angles.

By use of mirror (denoted 204 in FIG. 1—may be a motorized mirror), the suggested system has the capability to change the angle of illumination on the sample (see FIG. 2). Thus, different information can be extracted from the sample. For example, in most crystal materials different phonons are sensitive to the direction of the incident electric field. By illuminating light mainly in normal direction ($NA_0$ 272 in FIG. 2), the electric field of linearly polarized light will be mostly in the direction parallel to the sample's surface (e.g. Ex), exciting one phonon (in Silicon that will be LO—Longitudinal Optic phonon). However, illuminating from a large angle ($NA_{+1}$ or $NA_{-1}$ for example the NAs denotes 271 and 273 in FIG. 2), some of the electric field is in the z direction (Ez), i.e. parallel to the surface's normal, which excites a different phonon (in Silicon [100]: TO—Transverse optic) in addition to the LO phonon. Exciting these different phonons can contribute, in case the outcome Raman spectra in different angles is uncorrelated, i.e. each spectrum is correlated to different parameters in the sample, or in case one parameter requires information from both angles.

Figure 3:
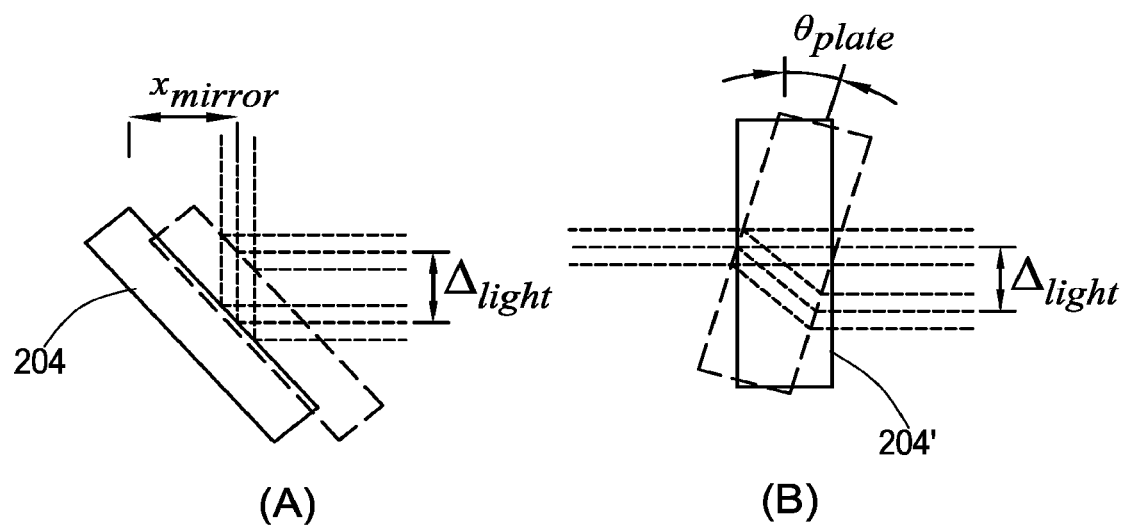
FIG. 3 illustrates examples of changing an angle of illumination.

We suggest two methods to displace a beam by amount $\Delta_{light}$ (see FIG. 3):

A. In reflection: using a linear motor to displace mirror 204 (FIG. 3) such that:

$$\Delta_{light} = x_{mirror} \quad [1]$$

B. In refraction: tilting an optical plate of a transparent plate 204' instead of mirror such that ($t_{plate}$, $n_{plate}$ and $\theta_{plate}$ are the plate's thickness, refractive index and tilt angle, respectively):

$$\Delta_{light} = t_{plate} \sin \theta_{plate} \left[ 1 - \frac{\cos \theta_{plate}}{\sqrt{n_{plate}^2 - \sin^2 \theta_{plate}}} \right] \quad [2]$$

Both suggested methods A and B allow scanning only in one direction. scanning in the perpendicular direction can be done by:
  a. In A: using another mirror rotated by 90 degrees relative to the current mirror
  b. In B: using another tilted plate or tilting the same plate in two orthogonal angles
  c. A composition of A and B
  d. Rotating the sample Thus, with AOI control at two axes, the electric field distribution 260 in illumination is given by $E_{ill}(x - r_{AOI} \cos \theta_{AOI}, y - r_{AOI} \sin \theta_{AOI})$ (see FIG. 4), where (x,y) is the objective aperture stationary axes and ($r_{AOI}$, $\theta_{AOI}$) are the polar coordinates of the illumination beam center (controlled via AOI such that $\Delta_{light}^{(x)} = r_{AOI} \cos \Delta_{AOI}$ and $\Delta_{light}^{(y)} = r_{AOI} \sin \theta_{AOI}$).

Illumination Polarization Control

As described above and in FIG. 1, the combination of three elements: mirror 204, illumination polarizer 209, and illumination rotating HWP 211, allow control of the polarization direction in illumination.

The illumination polarizer 209 could be a fixed element, its task is to increase the contrast of polarized light before it reaches the sample. The direction of polarized light should be either 's' or 'p' relative to the beam splitter 210 before it reaches the sample, as any other direction will introduce elliptical polarization in reflection due to difference in Fresnel reflections (magnitude and phase) between 's' and 'p' polarized light. Thus, the illumination polarizer 209 could be adjusted by rotating about the optical axis to achieve maximum contrast in reflection from the beam splitter 210.

After reflection, the light reaches the illumination rotating HWP 211, which is positioned in a manner that its fast axis is at an angle $\phi_{HWP}$ relative to the incident polarization. After crossing it, the polarization is rotated by twice that amount, achieving an angle $2\phi_{HWP}$ relative the original polarization. Thus, with AOI and polarization control, the illumination beam field distribution, upon the objective's aperture stop is described by the following formula (see FIG. 4):

$$\vec{E}_{illumination}^{(12)} = E_0(x - r_{AOI} \cos\theta_{AOI}, y - r_{AOI}\sin\theta_{AOI}) \begin{bmatrix} \cos(2\phi_{HWP}) \\ \sin(2\phi_{HWP}) \end{bmatrix} \quad [3]$$

Where $E_0(x, y)$ is the field distribution at the aperture plane before the AOI transformations and the superscript "12" indicates that this is the field on the aperture stop at illumination. Upon crossing the objective, each (x-y) point on the aperture is refracted in a different angle, resulting in variations in polarization state when hitting the sample. These variations affect the intensity distribution and polarization state of the incoherent scattered light from the sample.

This can be formulated as a general two-dimensional Stokes vector:

$$\vec{S}_{scattered}^{(12)} = \begin{bmatrix} S_0^{(12)} \\ S_1^{(12)} \\ S_2^{(12)} \\ S_3^{(12)} \end{bmatrix} (x, y, r_{AOI}, \theta_{AOI}, \phi_{HWP}) \quad [4]$$

Where $S_{0-3}(x, y, r_{AOI}, \theta_{AOI}, \phi_{HWP})$ are real functions of x, y, $r_{AOI}$, $\theta_{AOI}$ and $\phi_{HWP}$.

Collection polarization measurement: In collection, there are three participating elements in evaluating polarization state (in the following order, for an incoherent beam exiting the sample, neglecting the effect of the objective and beam-splitter on the scattered light): the illumination rotating HWP 211, collection rotating QWP 215 and collection rotating polarizer 216. For simplicity, the beam splitter's 210 effect on polarization is neglected.

When the scattered light passes through the illumination rotating HWP 211 it undergoes a phase difference between polarization components (same as in illumination). Thus, for the simple case of the scattered light polarization being equal to illumination polarization (the latter was rotated by angle $2\phi_{HWP}$ after crossing the ½ waveplate (HWP)), than in the return direction it is rotated in the opposite direction by an angle $-2\phi_{HWP}$, retrieving the original polarization above the ½ waveplate (HWP). Using Muller calculus, the effect of the illumination rotating HWP 211 on the scattered light is as follows:

$$\vec{S}_{scattered}^{(11)} = \begin{bmatrix} 1 & 0 & 0 & 0 \\ 0 & \cos(4\phi_{HWP}) & \sin(4\phi_{HWP}) & 0 \\ 0 & \sin(4\phi_{HWP}) & -\cos(4\phi_{HWP}) & 0 \\ 0 & 0 & 0 & -1 \end{bmatrix} \vec{S}_{scattered}^{(12)} = \quad [5]$$

$$\begin{bmatrix} S_0^{(12)} \\ \cos(4\phi_{HWP})S_1^{(12)} + \sin(4\phi_{HWP})S_2^{(12)} \\ \sin(4\phi_{HWP})S_1^{(12)} - \cos(4\phi_{HWP})S_2^{(12)} \\ -S_3^{(12)} \end{bmatrix}$$

After crossing illumination rotating HWP 211, the scattered light is partially transmitted through the beam-splitter. Above it, two options are suggested for implementing polarization measurement/

A collection rotating polarizer 216 (angle $\phi_{CLP}$) only, collection rotating QWP 215 is removed. In this case, $\vec{S}_{scattered}^{(16)}$ will be:

$$\vec{S}_{scattered}^{(16)} = \frac{1}{2} \begin{bmatrix} 1 & \cos(2\phi_{CLP}) & \sin(2\phi_{CLP}) & 0 \\ \cos(2\phi_{CLP}) & \cos^2(2\phi_{CLP}) & \frac{1}{2}\sin(4\phi_{CLP}) & 0 \\ \sin(2\phi_{CLP}) & \frac{1}{2}\sin(4\phi_{CLP}) & \sin^2(2\phi_{CLP}) & 0 \\ 0 & 0 & 0 & 0 \end{bmatrix} \vec{S}_{scattered}^{(11)} \quad [6]$$

Which allows extraction of all stokes parameters but $S_3^{(12)}$. The stokes vectors for $\phi_{CLP} = 0$ and are (using equations [4]-[0] and dropping (x, y, $r_{AOI}$, $\theta_{AOI}$, $\phi_{HWP}$)):

$$\vec{S}_{scattered}^{(16)} = \frac{1}{2}\begin{bmatrix} 1 \\ \pm 1 \\ 0 \\ 0 \end{bmatrix}(S_0^{(11)} \pm S_1^{(11)}) = \frac{1}{2}\begin{bmatrix} 1 \\ \pm 1 \\ 0 \\ 0 \end{bmatrix}I_{scattered}^{(16)} \quad [7]$$

Where (+) and (−) signs are for $\phi_{CLP}=0$ and $$\phi_{CLP} = \frac{\pi}{2},$$

respectively. The intensity on the detector is:

$$I_{scattered}^{(16)} = S_0^{(12)}(x, y, r_{AOI}, \theta_{AOI}, \phi_{HWP}) \pm \quad [8]$$
$$\left(\cos(4\phi_{HWP})S_1^{(12)}(x, y, r_{AOI}, \theta_{AOI}, \phi_{HWP}) + \right.$$
$$\left.\sin(4\phi_{HWP})S_2^{(12)}(x, y, r_{AOI}, \theta_{AOI}, \phi_{HWP})\right)$$

Thus, by measuring the intensity on the detector for $\phi_{CLP}=0$ and $$\frac{\pi}{2},$$

this configuration allows interpreting partial information on the Raman scattered light (enabling to extract $S_0^{(12)}$ and the summation $\cos(4\phi_{HWP})S_1^{(12)}+\sin(4\phi_{HWP})S_2^{(12)}$).

B—In this option, the combination of the ¼ waveplate (QWP) and the collection polarizer allows to receive the full Stokes vector of the scattered light. The waveplate is allowed to rotate with rotation angle $\phi_{QWP}$ whereas the collection polarizer is stationary in either 'p' or 's' polarizations. After crossing both elements, $\vec{S}_{scattered}^{(16)}$ is (for horizontal polarizer):

$$\vec{S}_{scattered}^{(16)} = \frac{1}{2}\begin{bmatrix} 1 & \cos^2(2\phi_{QWP}) & \frac{1}{2}\sin(4\phi_{QWP}) & \sin(2\phi_{QWP}) \\ 1 & \cos^2(2\phi_{QWP}) & \frac{1}{2}\sin(4\phi_{QWP}) & \sin(2\phi_{QWP}) \\ 0 & 0 & 0 & 0 \\ 0 & 0 & 0 & 0 \end{bmatrix}\vec{S}_{scattered}^{(11)} \quad [9]$$

Substituting [5] in [9] yields the intensity on the detector:

$$I_{scattered}^{(16)} = S_0^{(12)} + \cos^2(2\phi_{QWP})\left(\cos(4\phi_{HWP})S_1^{(12)} + \sin(4\phi_{HWP})S_2^{(12)}\right) + \quad [10]$$
$$\frac{1}{2}\sin(4\phi_{QWP})\left(\sin(4\phi_{HWP})S_1^{(12)} - \cos(4\phi_{HWP})S_2^{(12)}\right) - \sin(2\phi_{QWP})S_3^{(12)}$$

Angular Resolved Raman (ARS)

Figure 5:
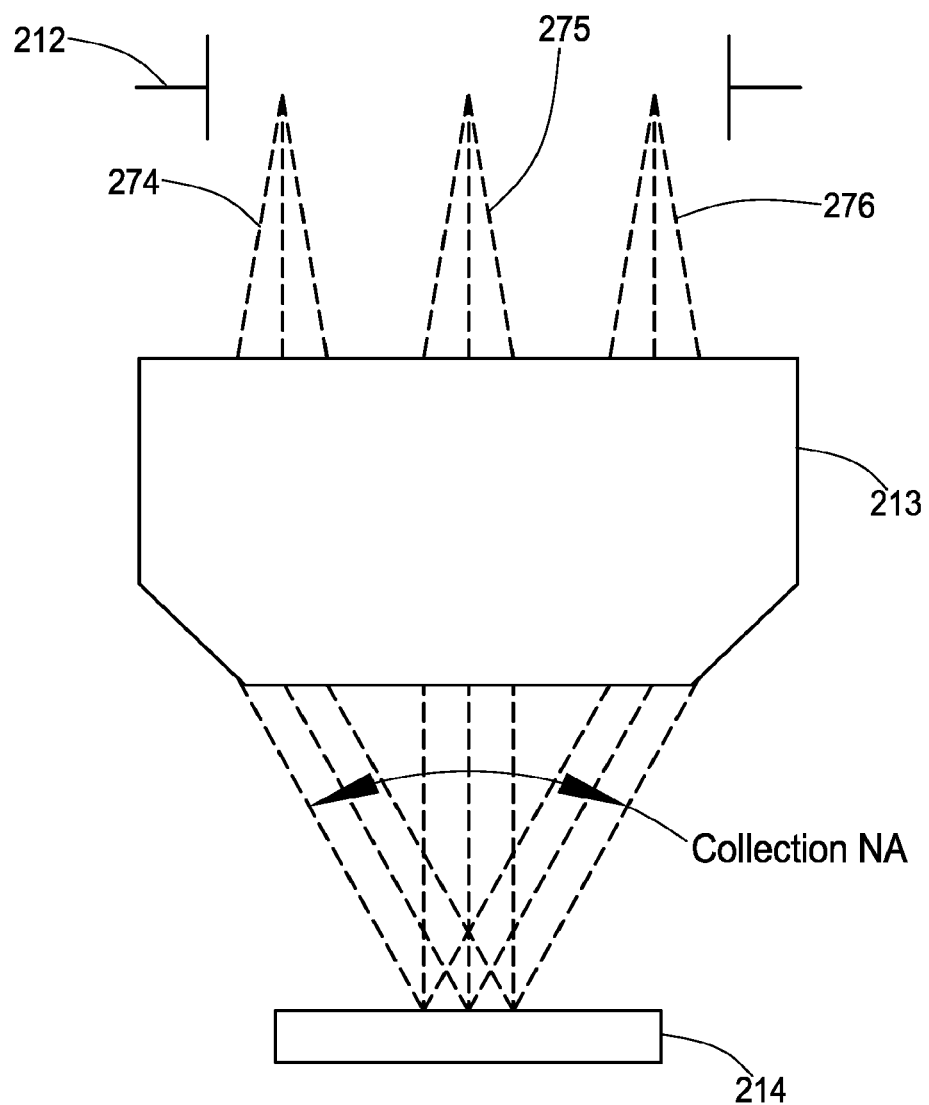
FIG. 5 illustrates examples of collecting radiation from different angles.

The suggested system enables one to retrieve information on the Raman scattering distribution from different angles of the sample. In that sense, the scattered light can be decomposed to a series of plane waves, where each of these plane waves is focused onto a distinct point on the objective aperture stop/back focal plane 212 (see FIG. 5 with different plane waves 274, 275 and 276—at the center and edges of the numerical aperture of the objective lens).

Using second collection lens 221 and slit lens 225, an image of the aperture plane is formed on collection aperture stop 222.

Figure 6:
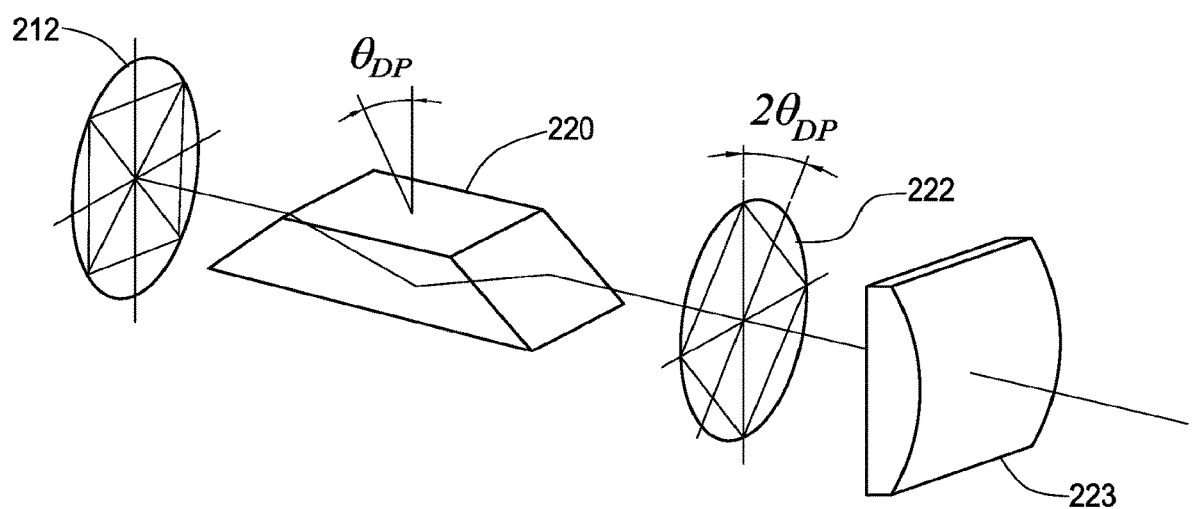
FIG. 6 illustrates an example of some elements of the illumination optics.

By using a dove prism 220, located between these lenses, and rotating it by angle $\theta_{DP}$ the collection aperture image on collection aperture stop 222 will be rotated by $2\theta_{DP}$ (see FIG. 6).

Figure 7:
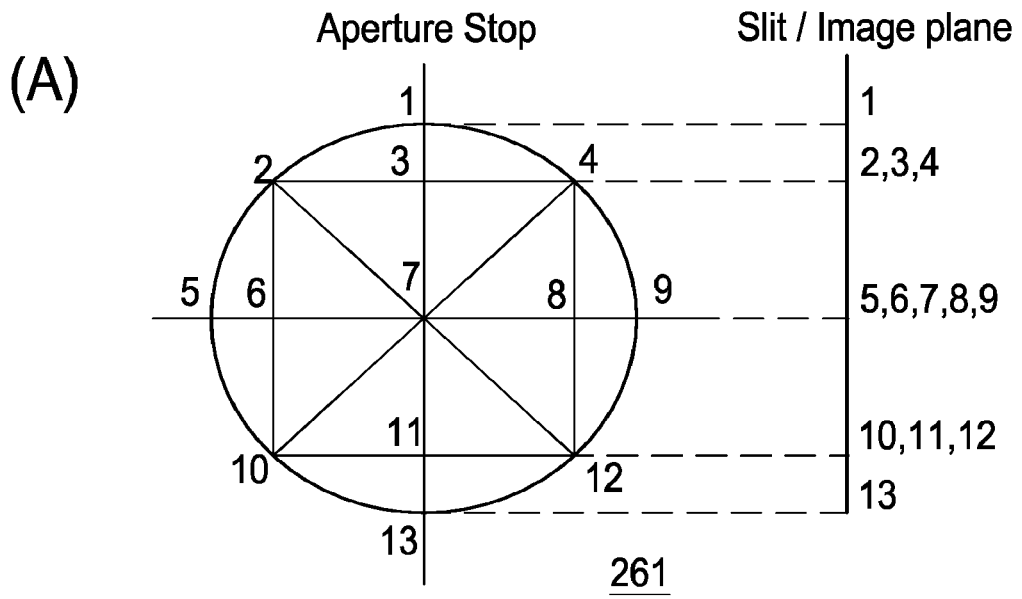
FIG. 7 illustrates examples of different orientation of a dove prism and the mapping between light from horizontal points and their projection in geometric points.
Figure 7:
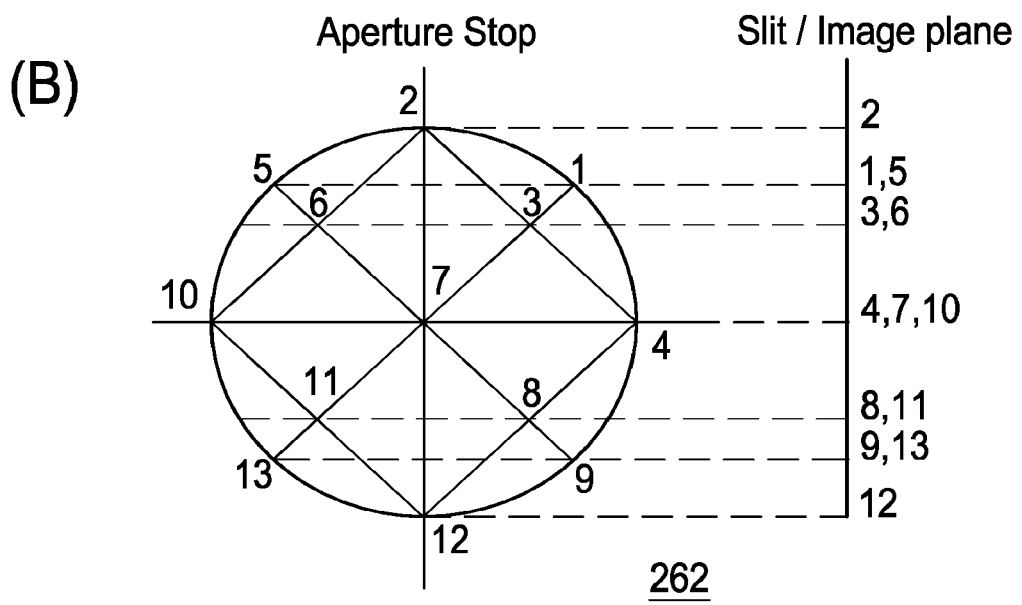
Figure 8:
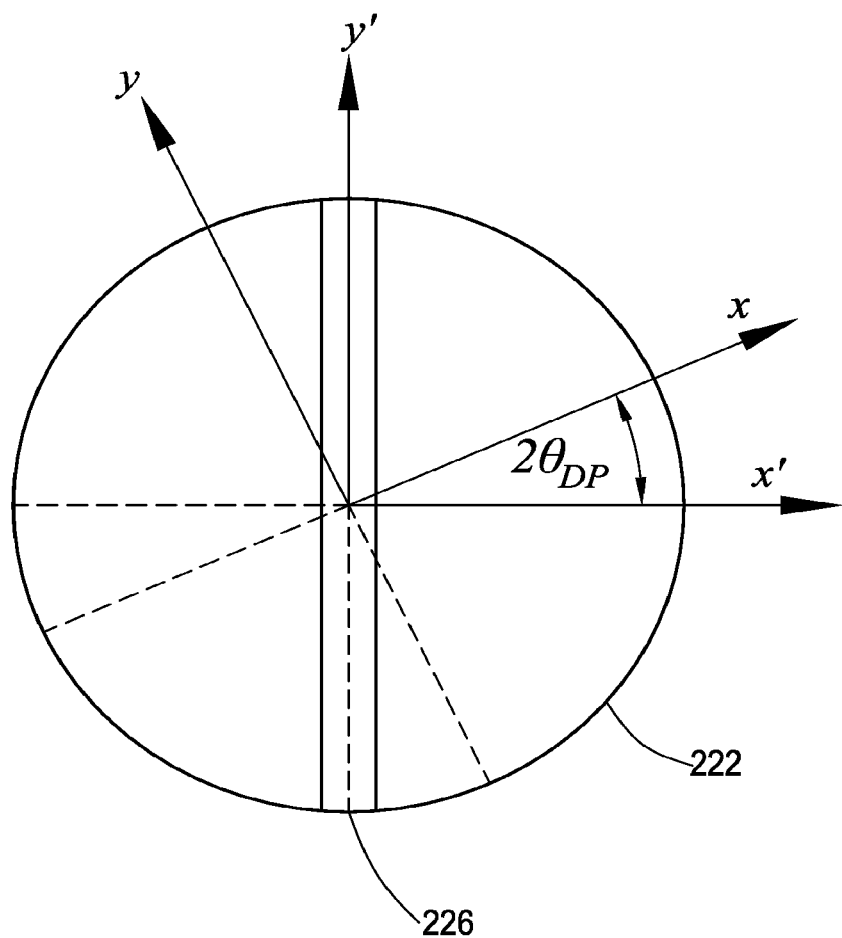
FIG. 8 illustrates examples of a slit and a collection aperture.

Neglecting non-ideal imaging effects (such as optical aberrations), the aperture-stop images after passing through an unrotated ($\theta_{DP}=0°$) and rotated ($\theta_{DP}=22.5°$) dove prism 261 and 262 are shown in FIG. 7—first and right sides of the figure, respectively. The cylindrical lens collects light from all adjacent horizontal points and focuses them onto a single geometric point. Thus, a thin line is formed along the vertical direction of the slit (y). For example, at $\theta_{DP}=0°$ points 5 through 9 are imaged onto a single point on the slit center, whereas at $\theta_{DP}=22.5°$ (aperture rotates by 45°) points 4,7 and 10 are summed at the center. Thus, if the intensity on the non-rotated aperture 212 is $I^{(12)}(x, y)$ (where (x, y) are the non-rotated coordinates) then the rotated aperture image 222 is:

$$I^{(22)}(x', y', \theta_{DP}) = \quad [11]$$
$$I^{(12)}(x'\cos 2\theta_{DP} - y'\sin 2\theta_{DP}, x'\sin 2\theta_{DP} + y'\cos 2\theta_{DP})$$

On the slit 226, after passing through both cylindrical and slit lenses, light rays along the 'x' axis are focused onto a single point. Therefore, the intensity distribution on the spectrometer's slit ($I^{(26)}$) is the accumulated intensity after integrating along the 'x' axis (the spectral direction):

$$I^{(26)}(y', \theta_{DP}) = \quad [12]$$
$$\int I^{(12)}(x'\cos 2\theta_{DP} - y'\sin 2\theta_{DP}, x'\sin 2\theta_{DP} + y'\cos 2\theta_{DP}) *$$
$$P(x', y', \theta_{DP})dx'$$

Where $P(x, y, \theta_{DP})$ is a known transfer function of the optical system and (*) states convolution. By taking several measurements at various rotation angles and using inversion formulas, one can reconstruct the original intensity on the aperture $I^{(12)}(x, y)$.

For the simple case in which systematic effects are negligible, $P(x', y', \theta_{DP})=\delta(x', y')$ (where $\delta(x, y)$ is delta function); thus, equation is reduced to the known Radon transform and $I^{(12)}(x, y)$ is found through an inverse Radon transform:

$$I^{(12)}(x, y) = \frac{1}{2\pi}\int_0^{\pi} I^{(26)}(y'(x, y, \theta_{DP}), \theta_{DP}) * g(x, y, \theta_{DP})d\theta_{DP} \quad [13]$$

where $y'(x, y, \theta_{DP})=y\cos 2\theta_{DP}-x\sin 2\theta_{DP}$ and $g(x, y, \theta_{DP})=\int_{-\infty}^{\infty}|r|e^{-iry'(x,y,\theta_{DP})}dr$.

Figure 9:
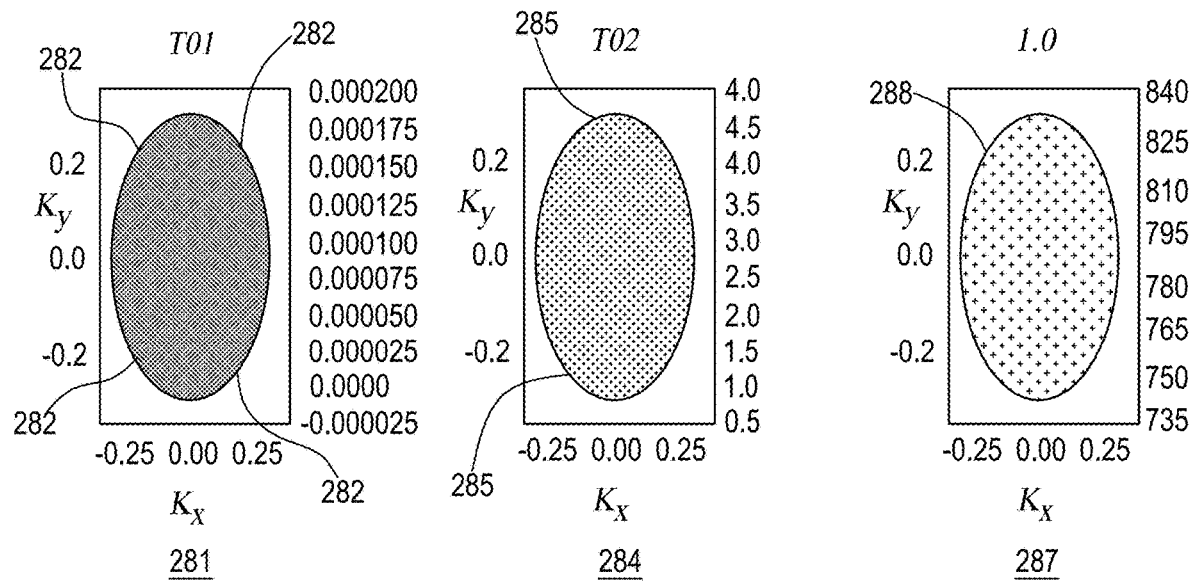
FIG. 9 illustrates examples of signals formed on a sensor at different phonon modes.
Figure 9:
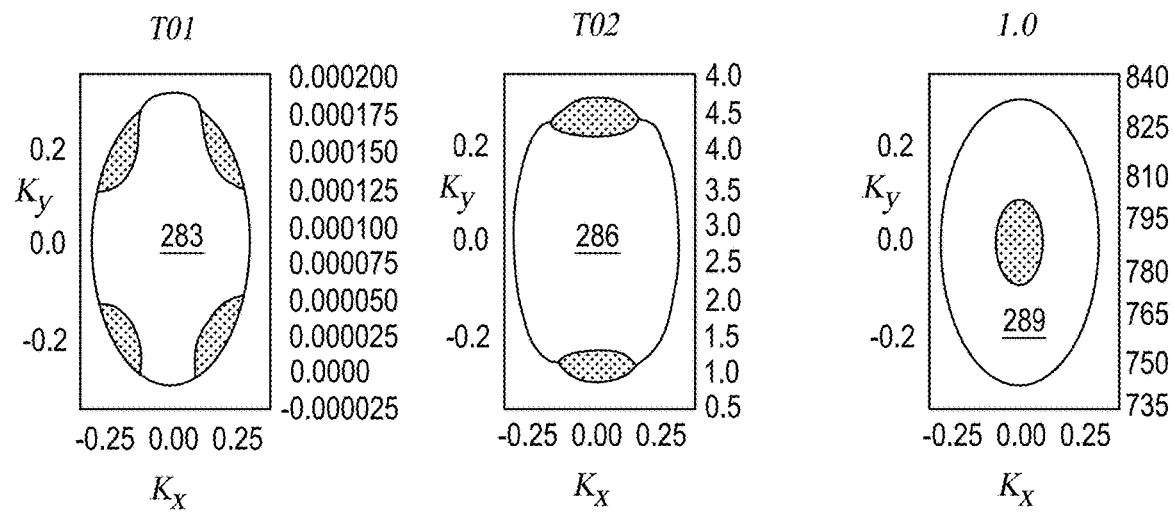

As an example to the benefit of the ARS technic, FIG. 9 shows the angular Raman scattering from Silicon substrate for Co-pol-0 configuration (where Co-pol refers to the case in which $\phi_{CLP}$ equals the illumination polarization state on the sample and the '0' means that $\phi_{HWP}=0$). In that case, equation [8] is reduced to $(r_{AOI}=\theta_{AOI}=0)$:

$$I^{(16)}_{scattered} = S^{(12)}_0(x, y, 0, 0, 0) + S^{(12)}_1(x, y, 0, 0, 0) \quad [14]$$

FIG. 9 illustrates examples of a silicon substrate has three different phonons (two Transverse modes (TO) and one longitudinal mode (LO)) with a very distinctive and singular NA map for each phonon. On the detector, information from all three phonons will be collected simultaneously.

TO1 phonons have more intensity at the edges—radiation pattern 281 of TO1 has regions of interest 282 at its edges centered at angles 45 degrees, 135 degrees, 225 degrees and 315 degrees.

TO2 phonons have more intensity at the edges—radiation pattern 282 of TO2 has regions of interest 285 at its edges centered at angles 90 degrees and 270 degrees.

LO phonon is more evident at the aperture center—radiation pattern 283 of LO has region of interest 288 at its center.

It should be noted that changes in one or more acquisition parameters may change the radiation pattern.

Which radiation pattern is expected to obtain when illumination a certain location of a wafer and at certain acquisition parameters may be represented by a model.

FIG. 9 illustrates that spatial filters (masks) 283, 286 and 289 may be are applied on the NA/aperture plane to mask irrelevant signals in each one of TO0, TO1 and LO.

Thus, by measuring at two dome configurations, at $\theta_{DP}=0$ and $$\frac{\pi}{8},$$

one can decouple the information of the TO phonons from that of the masking LO phonon.

Mask on the NA/Aperture Plain

An additional implementation of ARS is the use of spatial masks in the aperture plain 222 instead of the rotating dove prism 220 and the cylindrical lens 223. Using Raman modeling capabilities, we can simulate the angular dependence of each vibrational mode. Different vibrational modes have different distributions along the aperture plain. For example, in FIG. 9 the angular distribution of the aperture plain of the 2 Transverse modes (TO) and the longitudinal mode (LO) of bare Si in co-0 configuration is presented.

Using a mask will allow to block/pass specific modes of interest. There are several use cases for such a technique. For example to increase the extinction ratio (super nulling configuration) and increase the sensitivity to specific layers on top of the Si substrate. An additional application is using these masks to couple to each mode (LO or TO) for strain decomposition or to couple to different materials in the stack of interest.

Figure 10:
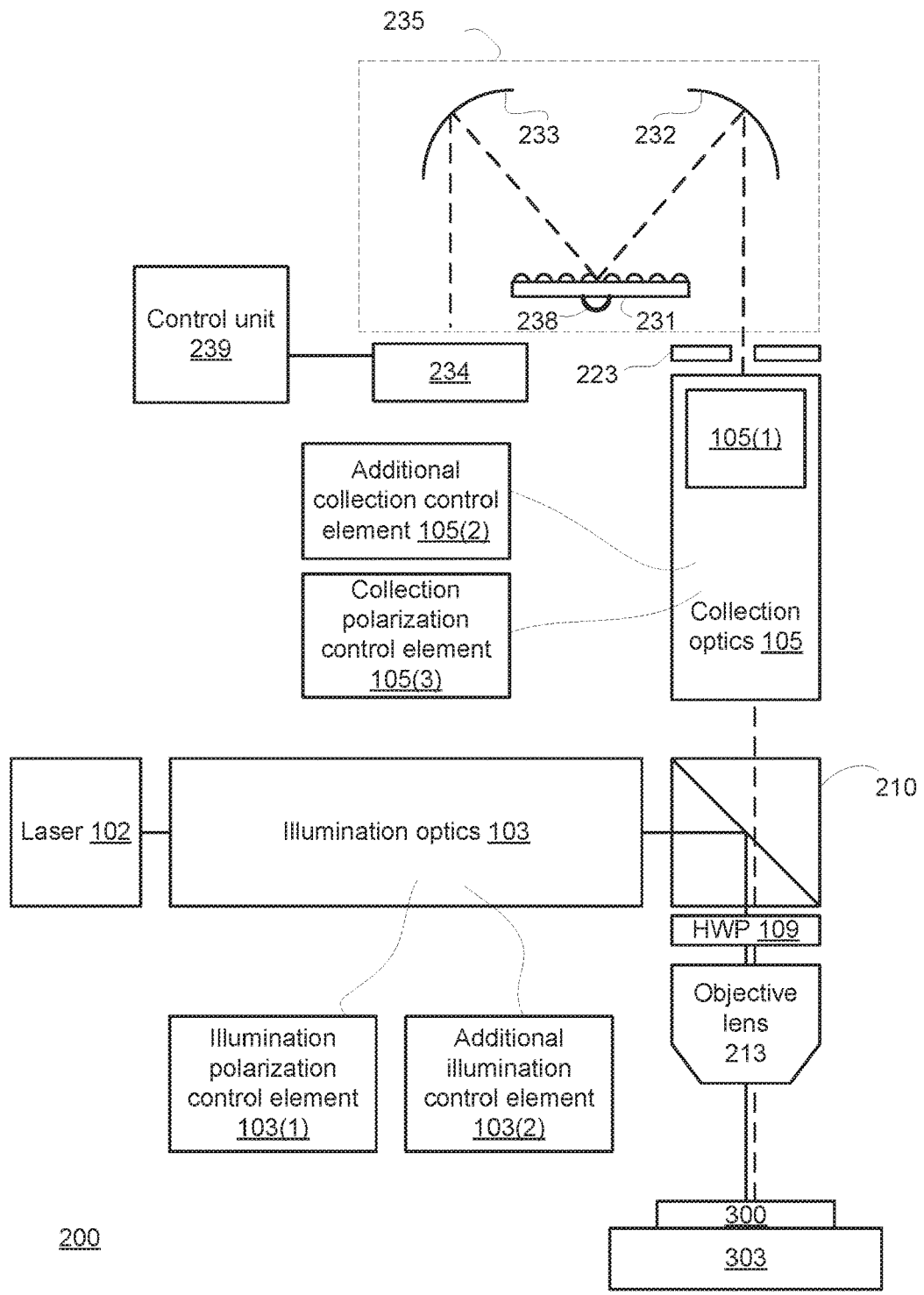
FIG. 10 is an example of an optical measurement system.

FIG. 10 is an example of an optical measurement system 200.

Optical measurement unit 200 includes an illumination path, a collection path, a control unit and a mechanical movement unit 303 for supporting sample 300 and for moving the sample 300 in relation to the collection and illumination paths. It should be noted that the sample 300 may be static while the illumination and/or collection paths may move. It should be noted that both the sample 300 and at least one path of the collection and/or illumination may move in relation to each other.

In FIG. 10 the collection path and the illumination path share an objective lens 213, and a half wavelength plate (HWP) 109. It should be noted that the illumination path and the collection path may share more components, may share other components, or may not share any component.

In FIG. 10 the illumination angle and the collection angle are perpendicular to the sample. It should be noted that any other illumination angles and/or collection angles may be provided.

The illumination path is configured to control various parameters of an illumination beam such as but not limited to polarization, frequency spectrum, shape, size, coherency, path, intensity, and the like. Various elements illustrated in the figure assist in the control of said parameters. Elements that control polarizations are referred as polarization control elements. Elements that control other parameters of the beam are referred to as additional control elements. It should be noted that a single element may control one or more parameters of the beam. Non-limiting examples of elements include polarizers, half waveplates, quarter waveplates, analyzers, lenses, grids, apertures, and the like.

The collection path is configured to control various parameters of the impinging beam such as but not limited to polarization, frequency spectrum, shape, size, coherency, path, intensity, and the like. Various elements illustrated in the figure assist in the control of said parameters.

The illumination path is illustrated as including (a) laser 102, (b) illumination optics 103 that include illumination polarization control element 103(1) and additional illumination control element 103(2), (c) a beam splitter such as dichroic beam splitter 210, (d) HWP 109, and (e) objective lens 213. The additional illumination control element may control one or more parameters that differ from polarization—for example shape, size, angle of propagation, and the like.

The collection path is illustrated as including (a) a beam splitter such as dichroic beam splitter 210, (b) HWP 109, (c) objective lens 213, (d) collection optics 105 that include adjustable optics 105(1) for changing the collection path thereby compensating for misalignments, additional collection control element 105(2), and collection polarization control element 105(3), (e) spatial filter 223, and (f) optical unit 235 (e.g. an optical spectrometer) that includes a grid/grating 231, first lens/mirror 232 for directing radiation that passed through the region of interest onto the grid 231, second lens/mirror 233 for directing light from grid 231 towards detector 234.

Figure 4:
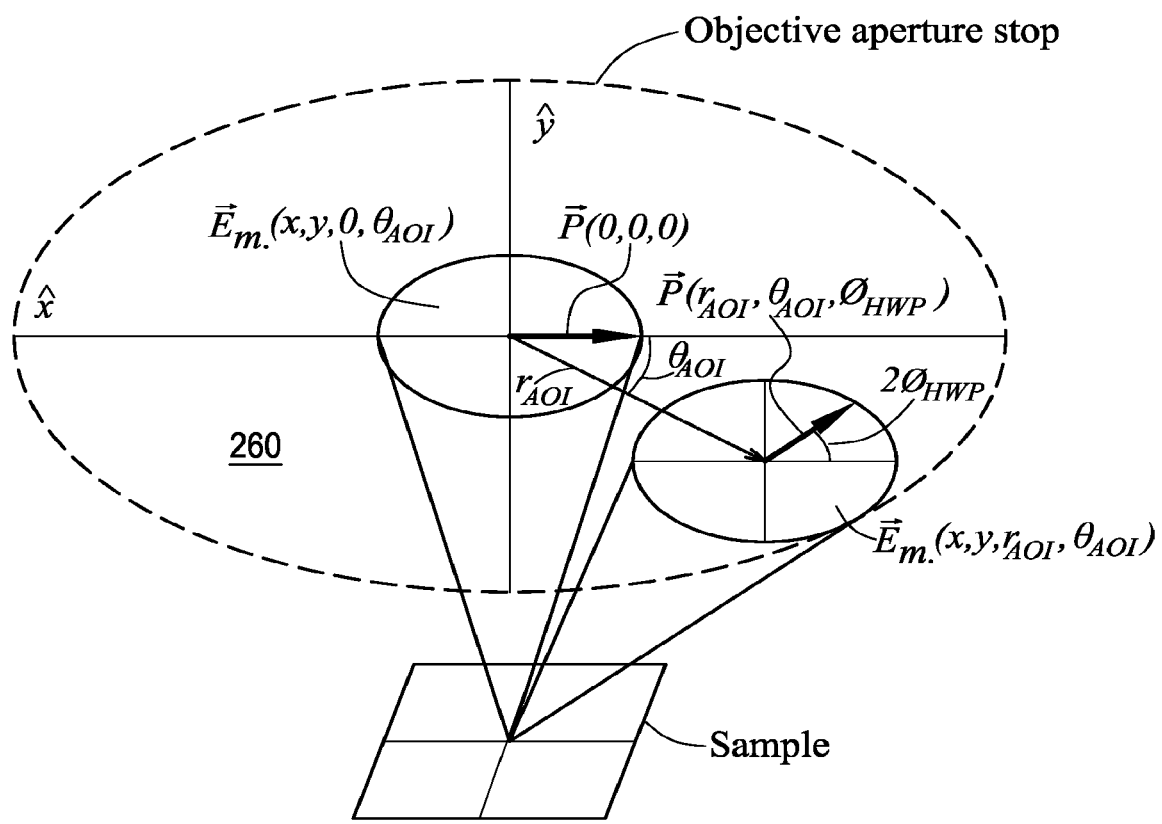
FIG. 4 illustrates examples of electrical field distributions.

The optical unit 235 is configurable in the sense that the spatial relationship between the grid 231 and at least the second lens 233 may be altered to direct different radiation lobes from the grid 231 towards the second lens 233. FIG. 4 (as well FIGS. 10 and 11) illustrates a rotating unit 238 that may rotate the grid 231 in relation to the first and second lenses. Movements other than rotations may be used to change the spatial relationship between the elements of optical unit 235.

Detector 234 is configured to generate Raman spectra. The detector 234 is coupled to control unit 239 that is configured to control various components/units/elements of the optical measurement system and may be configured to control the calibration process.

Figure 11:
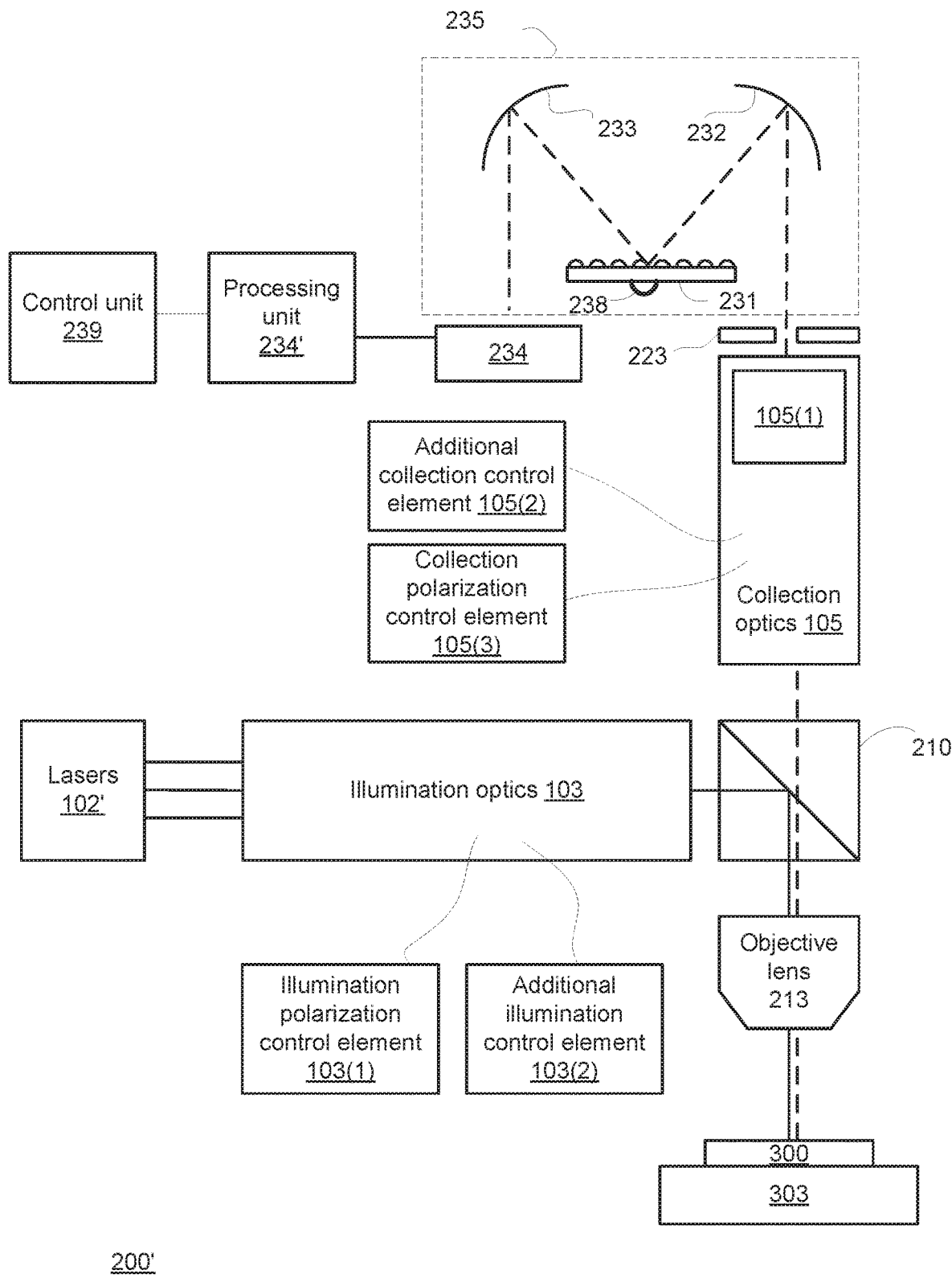
FIG. 11 is an example of an optical measurement system.

FIG. 11 is an example of an optical measurement system 200'.

Measurement system 200' differs from measurement unit 200 by (a) not including HWP 109, (b) including multiple lasers 102', and (c) including a processing unit 234' for processing detection signals. The illumination optics 103 may be configured to combine or select radiation from the multiple lasers. In some cases only one laser may be activated at a time.

Figure 12:
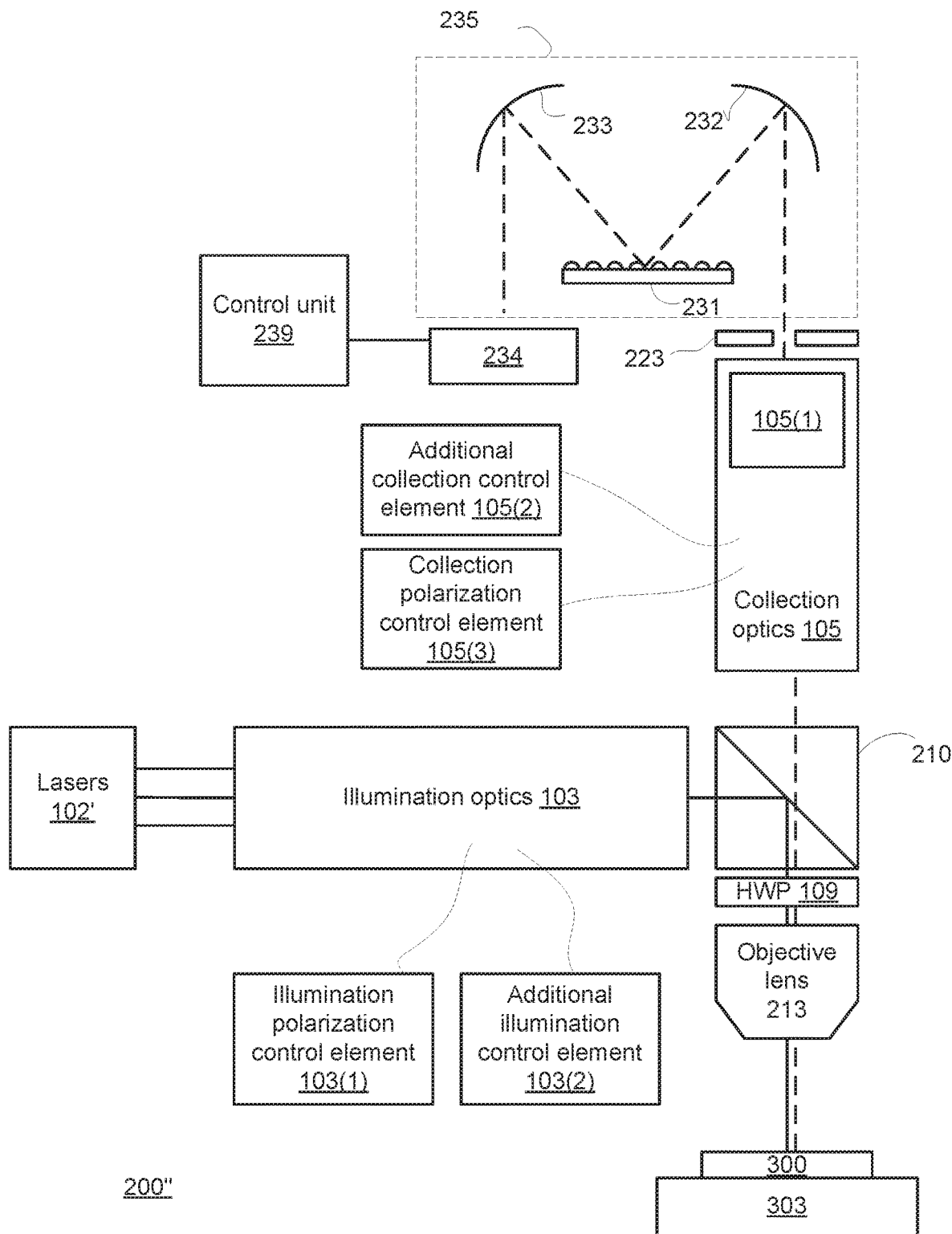
FIG. 12 is an example of an optical measurement system.

FIG. 12 is an example of an optical measurement system 200".

Measurement system 200" differs from measurement unit 200 by (a) including multiple lasers 102'. The illumination optics 103 may be configured to combine or select radiation from the multiple lasers. In some cases only one laser may be activated at a time.

Figure 13:
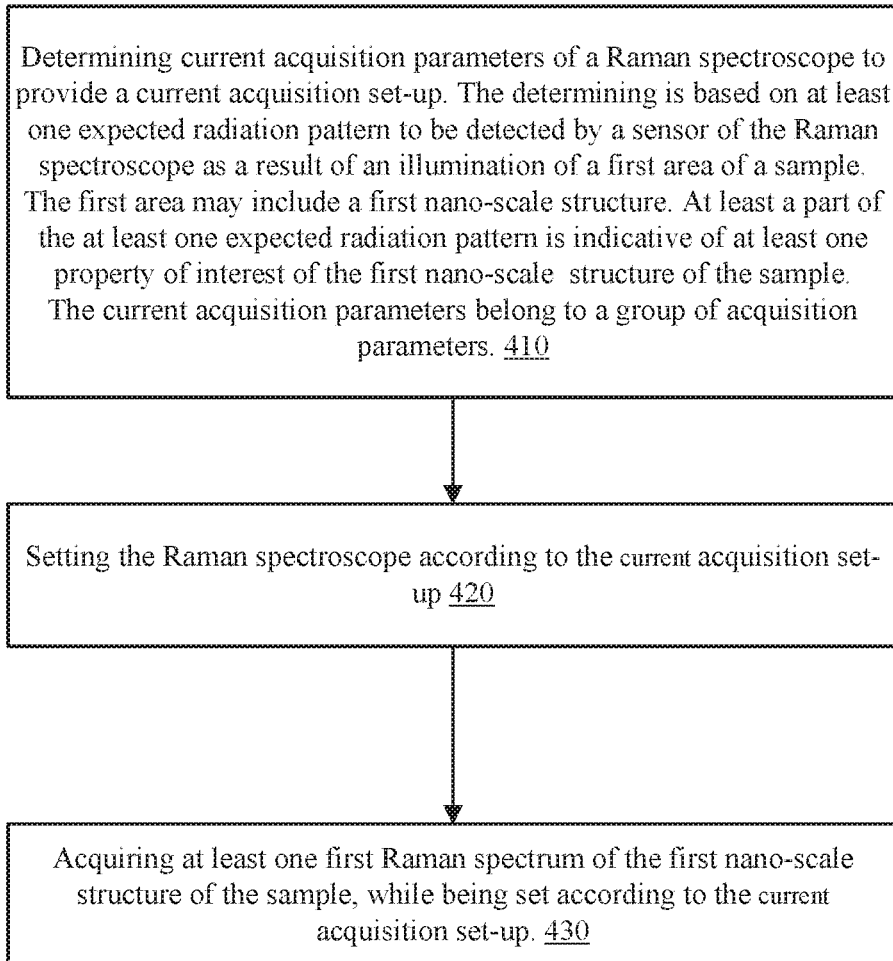
FIG. 13 illustrates an example of a method.

FIG. 13 illustrates an example of a method 400.

Method 400 may include one or multiple iterations of steps 410, 420 and 430.

Method 400 may start by step 410 of determining current acquisition parameters of a Raman spectroscope to provide a current acquisition set-up.

The determining is based on at least one expected radiation pattern to be detected by a sensor of the Raman spectroscope as a result of an illumination of a first area of a sample.

The first area may include a first nano-scale structure.

At least a part of the at least one expected radiation pattern is indicative of at least one property of interest of the first nano-scale structure of the sample.

The current acquisition parameters belong to a group of acquisition parameters.

Step 410 may be based on a model that maps different acquisition set-ups, to different expected radiation patterns. The model is merely a non-limiting example for predicting maps the relationship between different acquisition set-ups and different expected radiation patterns.

The group of acquisition parameters may include an illumination angle, an illumination polarization, a collection angle, a collection polarization, an illumination spatial masking and a collection spatial masking.

At least one acquisition parameter may be changed between one iteration of steps 410, 420 and 430—to another iteration of steps 410, 420 and 430.

Current acquisition parameters may include an illumination angle, wherein the setting comprises determining a position of a mirror of an illumination path of the Raman spectroscope Current acquisition parameters may include an angular position of a dove prism of a collection path of the Raman spectroscope.

Current acquisition parameters may include a polarization set (provided, generated) by an optical module that may include an illumination polarizer, a rotating illumination half waveplate, and a rotating collection one fourth waveplate. Only a beam splitter may be positioned (a) in an optical path between the illumination polarizer and the rotating illumination half waveplate, and (b) in another optical path between the rotating collection one fourth waveplate and the rotating illumination half waveplate.

Current acquisition parameters may include a location of a spatial mask.

Step 410 may be followed by step 420 of setting the Raman spectroscope according to the current acquisition set-up.

Step 420 may be followed by step 430 acquiring at least one first Raman spectrum of the first nano-scale structure of the sample, while being set according to the current acquisition set-up.

Step 430 may include extracting different information regarding different phonon modes.

Steps 410, 420, and 430 may be repeated multiple times. A current iteration of steps 410, 420 and 430 may be repeated by a next iteration. This is illustrated by the dashed arrow from step 430 to step 410.

It should be noted that the analysis of radiation and/or a generating of a Raman spectrum from detection signals of a detector and/or an analysis of a Raman spectrum to determine features of the objects may be executed, at least in part, by a controller and/or a processing circuit that does not belong to the optical measurement system and/or may be remotely positioned from the illumination and/or collection paths.

There may be provided a method for Raman spectroscopy, the method may include determining first acquisition parameters of a Raman spectroscope to provide a first acquisition set-up, the determining may be based on at least one expected radiation pattern to be detected by a sensor of the Raman spectroscope as a result of an illumination of a first area of a sample, the first area may include a first nano-scale structure, wherein at least a part of the at least one expected radiation pattern may be indicative of at least one property of interest of the first nano-scale structure of the sample; wherein the first acquisition parameters belong to a group of acquisition parameters; setting the Raman spectroscope according to the first acquisition set-up; and acquiring at least one first Raman spectrum of the first nano-scale structure of the sample, while being set according to the first acquisition set-up.

The group may include an illumination angle, an illumination polarization, a collection angle, a collection polarization, an illumination spatial masking and a collection spatial masking.

The first acquisition parameters may include an illumination angle, wherein the setting may include determining a position of a mirror of an illumination path of the Raman spectroscope.

The first acquisition parameters may include an angular position of a dove prism of a collection path of the Raman spectroscope.

The first acquisition parameters may include a polarization set by an optical module that may include an illumination polarizer, a rotating illumination half waveplate, and a rotating collection one fourth waveplate; wherein only a beam splitter may be positioned (a) in an optical path between the illumination polarizer and the rotating illumination half waveplate, and (b) in another optical path between the rotating collection one fourth waveplate and the rotating illumination half waveplate.

The first acquisition parameters may include a location of a spatial mask.

The acquiring may include extracting different information regarding different phonon modes.

The determining may be based on a model that maps different acquisition set-ups, to different expected radiation patterns.

The method may include determining second acquisition parameters of the Raman spectroscope to provide a second acquisition set-up, the determining may be based on at least one expected radiation pattern to be detected by the sensor of the Raman spectroscope as a result of an illumination of a second nano-scale area of the sample, wherein at least a part of the at least one expected radiation pattern may be indicative of at least one property of interest of the second nano-scale area of the sample, the second acquisition parameters belong to the group; setting the Raman spectroscope according to the second acquisition set-up; and acquiring at least one second Raman spectrum of the second nano-scale area of the sample, while being set according to the second acquisition set-up.

There may be provided an optical measurement system that may include optics, the optics may include an illumination path and a collection path; a Raman spectroscope; a controller that may be configured to determine first acquisition parameters of a Raman spectroscope to provide a first acquisition set-up, the determining may be based on at least one expected radiation pattern to be detected by a sensor of the Raman spectroscope as a result of an illumination of a first area of a sample, the first area may include a first nano-scale structure, wherein at least a part of the at least one expected radiation pattern may be indicative of at least one property of interest of the first nano-scale structure of the sample; wherein the first acquisition parameters belong to a group of acquisition parameters; wherein the Raman spectroscope may be arranged to be configured according to the first acquisition set-up; and wherein the optics may be configured to acquire at least one first Raman spectrum of the first nano-scale structure of the sample, while being set according to the first acquisition set-up.

The group may include an illumination angle, an illumination polarization, a collection angle, a collection polarization, an illumination spatial masking and a collection spatial masking.

The first acquisition parameters may include an illumination angle, wherein the setting may include determining a position of a mirror of an illumination path of the Raman spectroscope.

The first acquisition parameters may include an angular position of a dove prism of a collection path of the Raman spectroscope.

The first acquisition parameters may include a polarization set by an optical module that may include an illumination polarizer, a rotating illumination half waveplate, and a rotating collection one fourth waveplate; wherein only a beam splitter may be positioned (a) in an optical path between the illumination polarizer and the rotating illumination half waveplate, and (b) in another optical path between the rotating collection one fourth waveplate and the rotating illumination half waveplate.

The first acquisition parameters may include a location of a spatial mask.

The optics may be configured to extract different information regarding different phonon modes.

The controller may be configured to determine based on a model that maps different acquisition set-ups, to different expected radiation patterns.

The controller may be configured to determine second acquisition parameters of the Raman spectroscope to provide a second acquisition set-up, the determining may be based on at least one expected radiation pattern to be detected by the sensor of the Raman spectroscope as a result of an illumination of a second nano-scale area of the sample, wherein at least a part of the at least one expected radiation pattern may be indicative of at least one property of interest of the second nano-scale area of the sample, the second acquisition parameters belong to the group; setting the Raman spectroscope according to the second acquisition set-up; and wherein the optics may be configured to acquire at least one second Raman spectrum of the second nano-scale area of the sample, while being set according to the second acquisition set-up.

There may be provided a non-transitory computer readable medium that stores instructions for: determining first acquisition parameters of a Raman spectroscope to provide a first acquisition set-up, the determining may be based on at least one expected radiation pattern to be detected by a sensor of the Raman spectroscope as a result of an illumination of a first area of a sample, the first area may include a first nano-scale structure, wherein at least a part of the at least one expected radiation pattern may be indicative of at least one property of interest of the first nano-scale structure of the sample; wherein the first acquisition parameters belong to a group of acquisition parameters; setting the Raman spectroscope according to the first acquisition set-up; and acquiring at least one first Raman spectrum of the first nano-scale structure of the sample, while being set according to the first acquisition set-up.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation; a single operation may be distributed in additional operations and operations may be executed at least partially overlapping in time. Moreover, alternative embodiments may include multiple instances of an operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The terms "including". "comprising", "having", "consisting" and "consisting essentially of" are used in an interchangeable manner. For example—any method may include at least the steps included in the figures and/or in the specification, only the steps included in the figures and/or the specification.

We claim:

1. An optical measurement system that comprises:
    optics, wherein the optics comprise a collection path and an illumination path that comprises a plurality of lasers, the optics is configured to acquire Raman spectrums of multiple sites of the sample while applying one or more optics parameters, the one or more optics parameters comprise at least one of a polarization parameter, a spatial filtering parameter, and an illumination parameter;
    an optical spectrometer;
    a Raman detector that is downstream to the optical spectrometer; and
    a control unit that is configured to control a calibration process and to set the one or more optics parameters based on at an outcome of a calibration process, the calibration process comprises analyzing one or more Ramas spectra; wherein the one or more optical parameters comprise an identity of a laser of the plurality of lasers.

2. The optical measurement system according to claim 1 wherein the one or more optical parameters comprise an angle of illumination.

3. The optical measurement system according to claim 2 wherein the control unit is configured to control the angle of illumination along two axes.

4. The optical measurement system according to claim 1 wherein the one or more optical parameters comprise a polarization of illumination.

5. The optical measurement system according to claim 1 wherein the one or more optical parameters comprise a configuration of an adjustable filter of the optics.

6. The optical measurement system according to claim 1 wherein the one or more optical parameters comprise a rotation of a rotatable wedge prism located upstream to the Raman detector.

7. The optical measurement system according to claim 1 wherein the control unit is configured to control when to excite a longitudinal optics phono and when to excite a transverse axis phonon.

8. The optical measurement system according to claim 1 wherein the control unit is configured to determine a number of stokes parameters to be extracted by analyzing the Raman spectra.

9. The optical measurement system according to claim 1 wherein the illumination path is configured to combine light from the plurality of lasers.

10. The optical measurement system according to claim 1 wherein the at least one adjustable spatial filter is configured to block scattered radiation from an illuminated area of the sample from reaching the Raman detector.

11. The optical measurement system according to claim 1 wherein the control unit is configured to measure at least one of parameters out of a strain profiling, a crystallinity, or dimension profiling.

12. An optical measurement system that comprises:
    optics, wherein the optics comprise a collection path and an illumination path that comprises a plurality of lasers, the optics is configured to acquire Raman spectrums of multiple sites of the sample while applying one or more optics parameters, the one or more optics parameters comprise at least one of a polarization parameter, a spatial filtering parameter, and an illumination parameter;
    an optical spectrometer;
    a Raman detector that is downstream to the optical spectrometer; and
    a control unit that is configured to control a calibration process and to set the one or more optics parameters based on at an outcome of a calibration process, the calibration process comprises analyzing one or more Ramas spectra; and
    wherein the one or more optical parameters comprise an angle between an optical axis of the illumination path and an illumination polarizer.

13. The optical measurement system according to claim 12 wherein the control unit is configured to determine the angle to increase a contrast of polarized light that propagates through the illumination path before the polarized light reaches a sample.

14. The optical measurement system according to claim 12 wherein the one or more optical parameters comprise an identity of a laser of the plurality of lasers.

15. An optical measurement system that comprises:
    optics, wherein the optics comprise a collection path and an illumination path that comprises a plurality of lasers, the optics is configured to acquire Raman spectrums of multiple sites of the sample while applying one or more optics parameters, the one or more optics parameters comprise at least one of a polarization parameter, a spatial filtering parameter, and an illumination parameter;
    an optical spectrometer;
    a Raman detector that is downstream to the optical spectrometer; and
    a control unit that is configured to control a calibration process and to set the one or more optics parameters based on at an outcome of a calibration process, the calibration process comprises analyzing one or more Ramas spectra; and
    wherein the control unit is configured to measure parameters of patterned structure of the sample, wherein the patterned structure comprises at least one of through silicon vias (TSVs), shallow trench isolation (STI) regions, or three dimensional NAND memory (3D-NAND) structures.

16. The optical measurement system according to claim 15 wherein the one or more optical parameters comprise an identity of a laser of the plurality of lasers.

17. A method for optical measurement, the method comprising:
    acquiring, by an optical measurement system that comprises optics, an optical spectrometer and a Raman detector, Raman spectrums of multiple sites of the sample while applying one or more optics parameters; wherein the optics comprises a collection path and an illumination path that comprises a plurality of lasers, wherein the one or more optics parameters comprise at least one of a polarization parameter, a spatial filtering parameter, and an illumination parameter; wherein the Raman detectors downstream to the optical spectrometer;

controlling, by a control unit of the optical measurement system, calibration process; and setting, by the control unit, the one or more optics parameters based on at an outcome of a calibration process, the calibration process comprises analyzing one or more Ramas spectra; wherein the one or more optical parameters comprise an identity of a laser of the plurality of lasers.

18. A non-transitory computer readable medium for optical measurement, the non-transitory computer readable medium stores instructions for:

acquiring, by an optical measurement system that comprises optics, an optical spectrometer and a Raman detector, Raman spectrums of multiple sites of the sample while applying one or more optics parameters; wherein the optics comprises a collection path and an illumination path that comprises a plurality of lasers, wherein the one or more optics parameters comprise at least one of a polarization parameter, a spatial filtering parameter, and an illumination parameter; wherein the Raman detectors downstream to the optical spectrometer;

controlling, by a control unit of the optical measurement system, calibration process; and setting, by the control unit, the one or more optics parameters based on at an outcome of a calibration process, the calibration process comprises analyzing one or more Ramas spectra; wherein the one or more optical parameters comprise an identity of a laser of the plurality of lasers.

* * * * *